United States Patent [19]

Homola et al.

[11] 4,451,495

[45] May 29, 1984

[54] INCREASING MAGNETIC PARTICLE CONCENTRATION IN MAGNETIC COATINGS

[75] Inventors: Andrew M. Homola, Morgan Hill; Max R. Lorenz, San Jose; Heinrich Sussner, Monte Sereno, all of Calif.

[73] Assignee: International Business Machines Corporation, Armonk, N.Y.

[21] Appl. No.: 412,675

[22] Filed: Aug. 30, 1982

[51] Int. Cl.$^3$ .......................... B05D 1/06; B05D 5/12
[52] U.S. Cl. ......................................... 427/27; 427/47; 427/48; 427/127; 427/128; 427/129; 427/130; 427/131; 427/219; 427/299
[58] Field of Search .................. 427/13, 27, 48, 47, 427/219, 128, 129, 130, 127, 131, 299; 252/62.51, 62.53, 313 S, 62.56, 62.59

[56] References Cited

U.S. PATENT DOCUMENTS

| | | | |
|---|---|---|---|
| 3,947,502 | 3/1976 | Leitner et al. | 252/62.59 |
| 4,280,918 | 7/1981 | Homola et al. | 252/62.51 |
| 4,333,961 | 7/1982 | Bruce et al. | 427/13 |

Primary Examiner—Michael R. Lusignan
Assistant Examiner—Janyce A. Bell
Attorney, Agent, or Firm—Walter J. Madden, Jr.

[57] ABSTRACT

A monolayer magnetic coating is prepared by applying magnetic particles which have an electrostatic charge in an aqueous environment to an active layer on a substrate, the active layer having an electrostatic charge in an aqueous environment opposite to the charge on the magnetic particles so that the particles bond to the active layer. The concentration of the electrolyte in which the charged particles are dispersed is adjusted to reduce the coulombic repulsive forces between the particles, permitting them to move close together and thereby increasing the magnetic particle packing in the resultant magnetic coating.

4 Claims, No Drawings

INCREASING MAGNETIC PARTICLE CONCENTRATION IN MAGNETIC COATINGS

TECHNICAL FIELD

This invention relates to methods for producing magnetic coatings having magnetic particles therein which are of small size, of uniform distribution throughout the coating, and magnetically aligned.

BACKGROUND ART

In the preparation of magnetic recording materials, such as for magnetic disks, and tapes, it has been common to use magnetic particles, such as gamma $Fe_2O_3$, dispersed in a binder mixture to form the magnetic recording material. A dispersion is usually formed by milling the ingredients together for an extended period of time in an effort to thoroughly coat the magnetic particles with the binder ingredients and to break up collections or aggregations of such particles. Magnetic particles of this type tend to cling together and it is desirable to reduce or eliminate this aggregation of particles in order to produce smaller effective magnetic particle sizes for higher density magnetic recording. The degree of uniform dispersion of the magnetic particles in the binder is an important factor in determining the final quality of the magnetic coating, as measured by the parameters of surface smoothness, orientation ratio, signal-to-noise ratio, off-track performance, modulation noise, coercive force and wear properties.

After filtering, this dispersion is coated onto a substrate by spin coating, dip coating, spray coating or doctor blade (gravure) coating. The magnetic particles in the wet coating are then magnetically aligned by moving the coated substrate past a magnetic field. The coating is then cured to improve hardness and durability. The cured magnetic coating may be ground to reduce the coating thickness and then buffed to improve surface roughness.

In order to increase the recording areal density, the coating thickness has to be reduced. Mechanical grinding to less than 5000 Å is difficult, if not beyond the limit of present technology. Also, as the coating thickness is reduced, the signal amplitude is decreased and this presents a major problem. New, higher moment particles and a higher pigment volume concentration (PVC) are needed. PVC may be defined as the percentage of magnetic material in the coating relative to the total volume of the binder material and the volume of the magnetic material. The PVC of current magnetic coatings is about 20-30%, and it is difficult to increase this and still maintain the rheological properties of the organic dispersion.

THE INVENTION

U.S. Pat. No. 4,333,961, assigned to the same assignee as the present application, discloses a process for producing a magnetic coating having a high PVC and good magnetic orientability. In that process, a so-called charged "active" layer is produced on a suitable disk substrate and magnetic particles having a charge opposite to that of the active layer are brought into contact with the active layer. The magnetic particles are coated with colloidal silica to reduce the tendency of the particles to agglomerate, as taught in U.S. Pat. No. 4,280,918, assigned to the same assignee as the present application.

The present invention relates to a process for increasing the concentration of magnetic particles in a magnetic coating produced using the process of U.S. Pat. No. 4,333,961 by decreasing the coulombic repulsion between the silica coated magnetic particles through controlling the electrolyte concentration in the aqueous dispersion containing the magnetic particles.

DESCRIPTION OF THE PREFERRED EMBODIMENT

The magnetic particles are first treated with HCl to facilitate the separation of aggregated particles. The acid is then removed and the particles are dispersed ultrasonically at pH=3.5. A colloidal silica dispersion in water (approximately 70 Å particles) is prepared and the pH of this dispersion is adjusted to 3.5 as taught in U.S. Pat. No. 4,280,918. At this pH, silica has a negative surface charge and gamma $Fe_2O_3$ or Co doped gamma $Fe_2O_3$ has a positive surface charge. By injecting an excess of such negatively charged colloidal silica particles into the ultrasonic flow cell containing the dispersion of positively charged gamma $Fe_2O_3$, the colloidal silica particles encapsulate the gamma $Fe_2O_3$, as discussed extensively in the above-identified patent. The dispersion consists of colloidal silica-coated gamma $Fe_2O_3$, which has a negative surface charge when the pH is higher than 2.5.

The present invention is employed to attenuate the coulombic repulsion between the silica coated particles in such a way that the mean particle separation is decreased sufficiently, but aggregation does not occur. As a result, these particles can be deposited in a disk with a high packing density without losing the advantage of a stable and well dispersed system.

This principle is best understood when considering the interaction energy of the colloidal particles $$U_{total} = U_{mag} + U_{el} + U_{vw}$$

In a stable system the attractive magnetic interaction ($U_{mag} \sim 1/r^3$) and van der Waal's interaction ($U_{vw} \sim A/r^6 - B/r^{12}$) are counterbalanced by the repulsive coulombic interaction ($U_{el} \sim \exp[-\kappa r]$) between the double layers of the charged particles (r=particle separation). The spatial extent of this repulsive force is determined by the Debye-Hückel screening length $1/\kappa$, where $\kappa$ is given by $$\kappa^2 = 4\pi/K_B T \epsilon \Sigma_i n_i z_i^2 e^2$$

where $\epsilon$=dielectric constant, $K_B$=Boltzman constant, T=temperature, n=concentration of electrolyte, z=valence of ions, and e=electron charge.

Therefore, by increasing the electrolyte concentration, the screening length $\kappa^{-1}$ decreases and consequently reduces the repulsive interaction between particles at a given particle separation. Applying this principle to the coating process of the above U.S. Pat. No. 4,333,961, the aqueous dispersion of magnetic particles is adjusted to a desired electrolyte concentration. Subsequently, the disk already coated with an active layer is exposed to a solution of the same electrolyte to ensure an identical ionic environment for particles and disk surface. As the coating is deposited on the disk, a magnetic field is applied thereto to magnetically align the magnetic particles in the desired direction.

After coating, the disk is spray washed with distilled water to remove any excess magnetic particles.

Following the procedure of the present invention, gamma $Fe_2O_3$ particles were deposited on polymer coated glass slides at various electrolyte concentrations. The polymer coat consisted of partially cured polyamide (Versamid-General Mills) and epoxy (Epon-Shell) capable of generating a positively charged interface in electrolyte systems.

The obtained data in Table I below shows that at higher electrolyte levels the number of particles or pigment volume concentration (PVC) increased approximately by 40% as compared with systems having low electrolyte concentrations.

TABLE I

| Electrolyte Concentration (mols/liter) | $<10^{-5}$ | $1 \times 10^{-5}$ | $1 \times 10^{-4}$ | $2 \times 10^{-3}$ |
|---|---|---|---|---|
| Magnetic moment $\times 10^4$ (emu/cm$^2$) | 7.33 | 7.76 | 7.76 | 10.56 |
| Electrolyte Concentration (mols/liter) | $6 \times 10^{-3}$ | $1 \times 10^{-2}$ | $5 \times 10^{-1}$ | |
| Magnetic moment $\times 10^4$ (emu/cm$^2$) | 11.12 | 10.75 | 11.06 | |

The particle number per area was measured using a vibrating sample magnetometer (VSM) and the results in emu units/cm$^2$ are directly proportional to the volume of magnetic material. In addition, several disks (25) were prepared at high and low electrolyte levels using the process of U.S. Pat. No. 4,333,961. The average moment of those disks (13) prepared in the presence of $1 \times 10^{-2}$ m/l NaCl electrolyte was measured at $1.6 \times 10^{-3}$ emu/cm$^2$, and in the absence of electrolyte (12 disks) only at $8 \times 10^{-4}$ emu/cm$^2$. The considerably higher PVC of these disks as compared to the results in Table I may be attributed to a magnetic field gradient which tends to concentrate particles prior to their interaction with a positively charged polymer layer. The higher PVC in those disks prepared in the presence of $1 \times 10^{-2}$ m NaCl electrolyte is strikingly visible when observing the coating under the scanning electron microscope.

Further, static as well as dynamic magnetic measurements show that the increase in moment and signal amplitude are achieved without degrading either the orientation ratio or the frequency resolution of the final disk.

Although the data above related to rigid disks, it will be understood that the invention may also be applied to flexible magnetic disks and to magnetic tape.

We claim:

1. A method for applying a magnetic coating to a substrate comprising the steps of:

coating said substrate with an active coating material having an electrostatic charge to form an active layer, applying a coating of colloidal silica particles on magnetic particles, said silica-coated magnetic particles being dispersed in an electrolyte, said electrolyte containing sodium chloride, adjusting the concentration of said electrolyte in said dispersion to reduce the coulombic repulsive forces between adjacent silica-coated magnetic particles to permit closer spacing between said particles, and applying said coated magnetic particles to said active layer, said silica-coated magnetic particles having an electrostatic charge thereon opposite to the charge on said active coating material, whereby said silica-coated magnetic particles are electrostatically attracted to and bonded to said active material to form a magnetic layer, 2. A method in accordance with claim 1, including the step of applying a magnetic field to said silica-coated magnetic particles as they are applied to said active layer to magnetically align said particles.

3. A method in accordance with claim 1 in which said electrolyte concentration is at least $10^{-5}$ mols per liter.

4. A method in accordance with claim 1 in which said electrolyte concentration is between $10^{-5}$ and $5 \times 10^{-1}$ mols per liter.

* * * * *